P. J. MARKS.
PHOTOGRAPHIC SHUTTER.
APPLICATION FILED APR. 2, 1917.
1,239,025.
Patented Sept. 4, 1917.
9 SHEETS—SHEET 3.
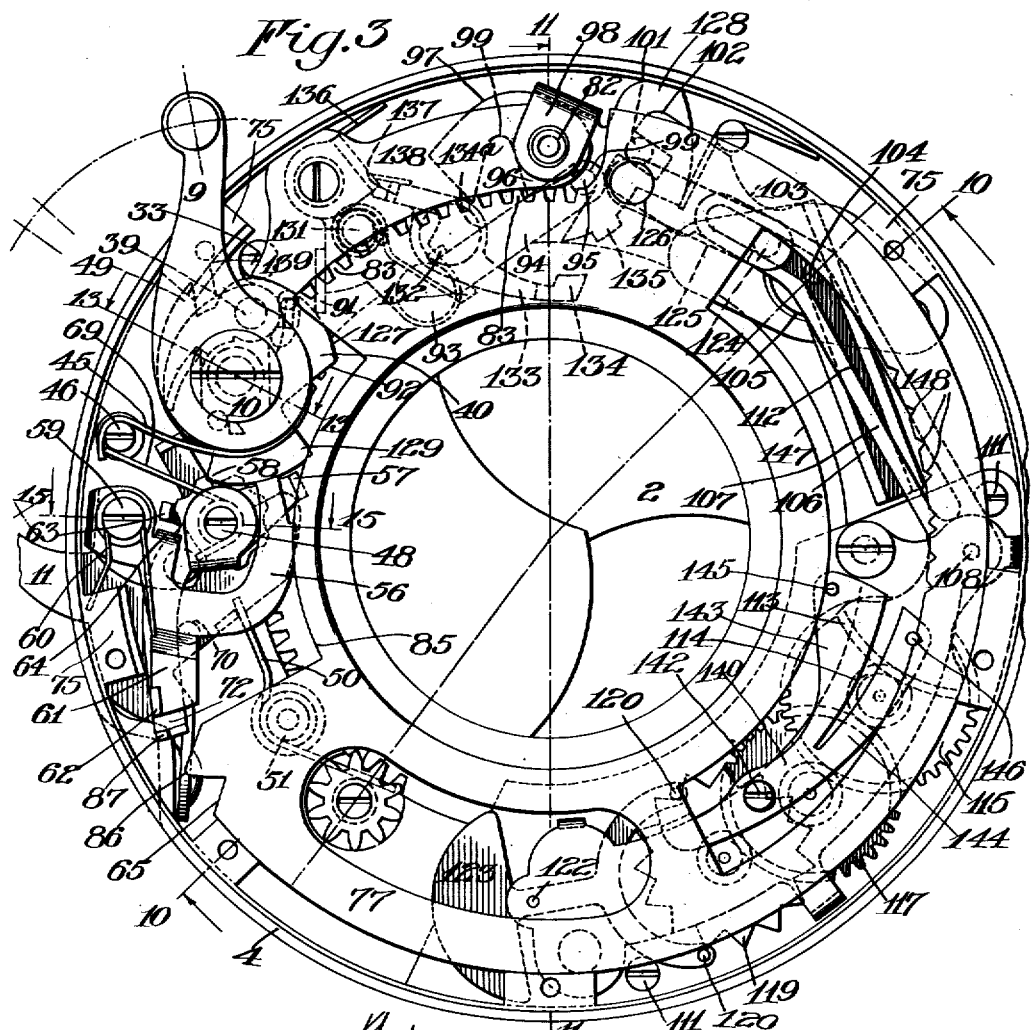
WITNESSES:
INVENTOR
Paul J. Marks
BY
his ATTORNEYS

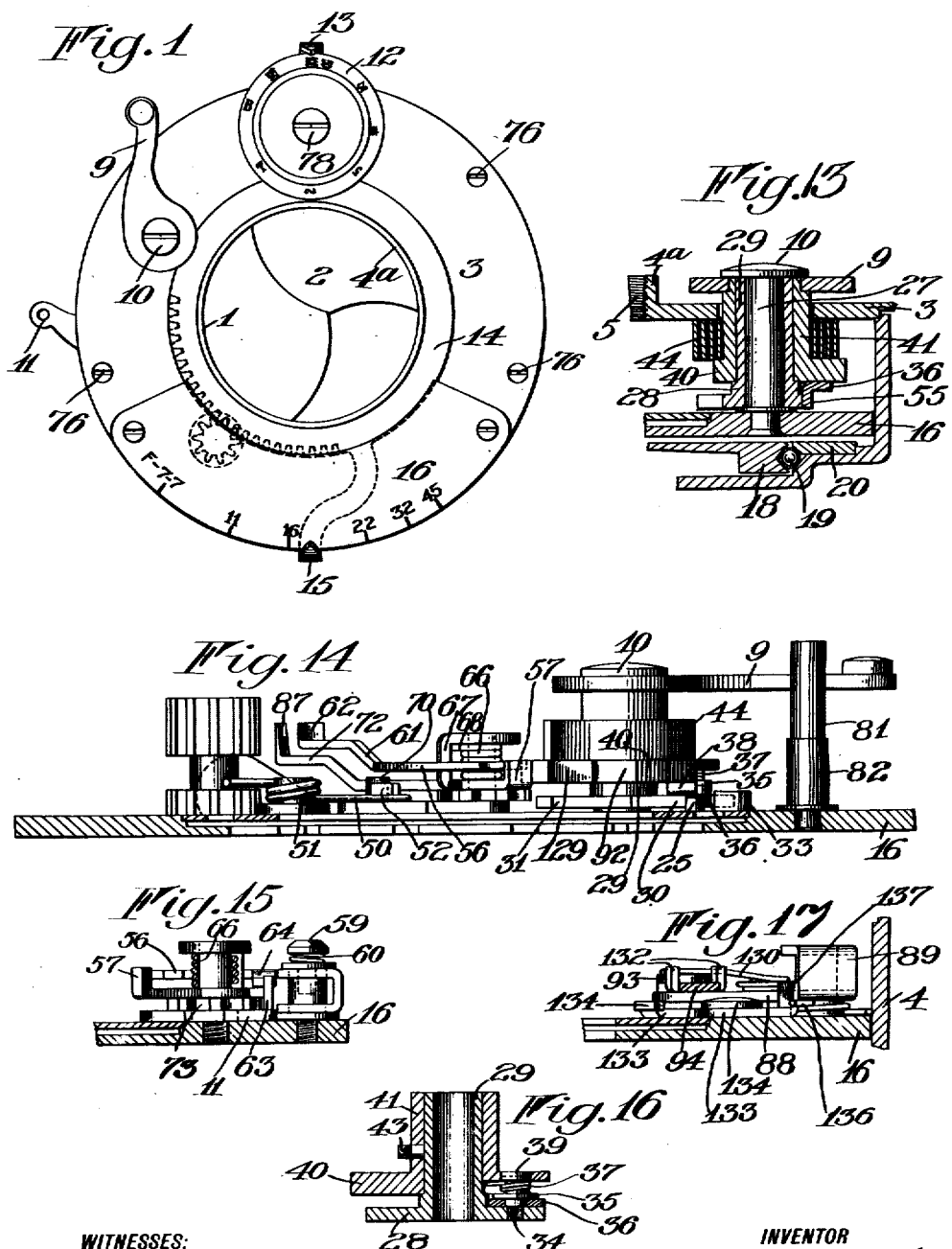

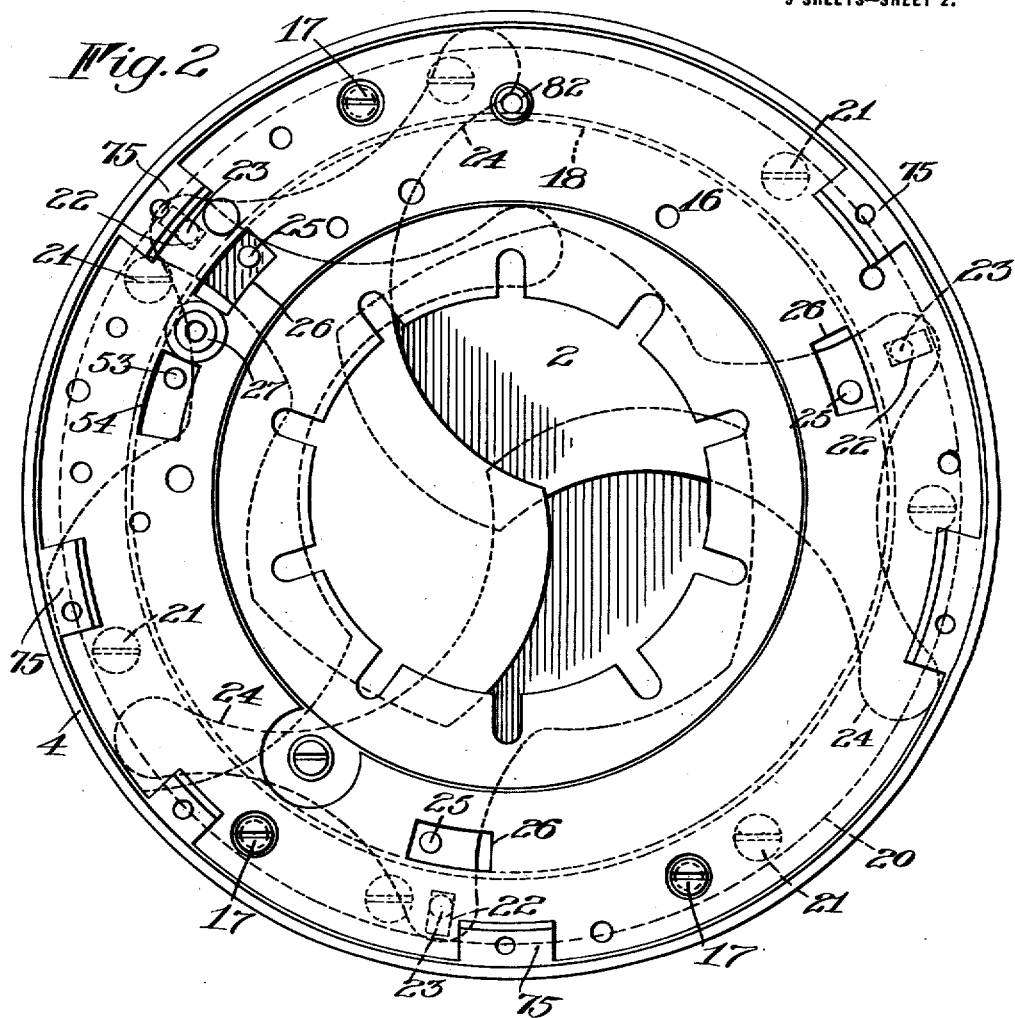

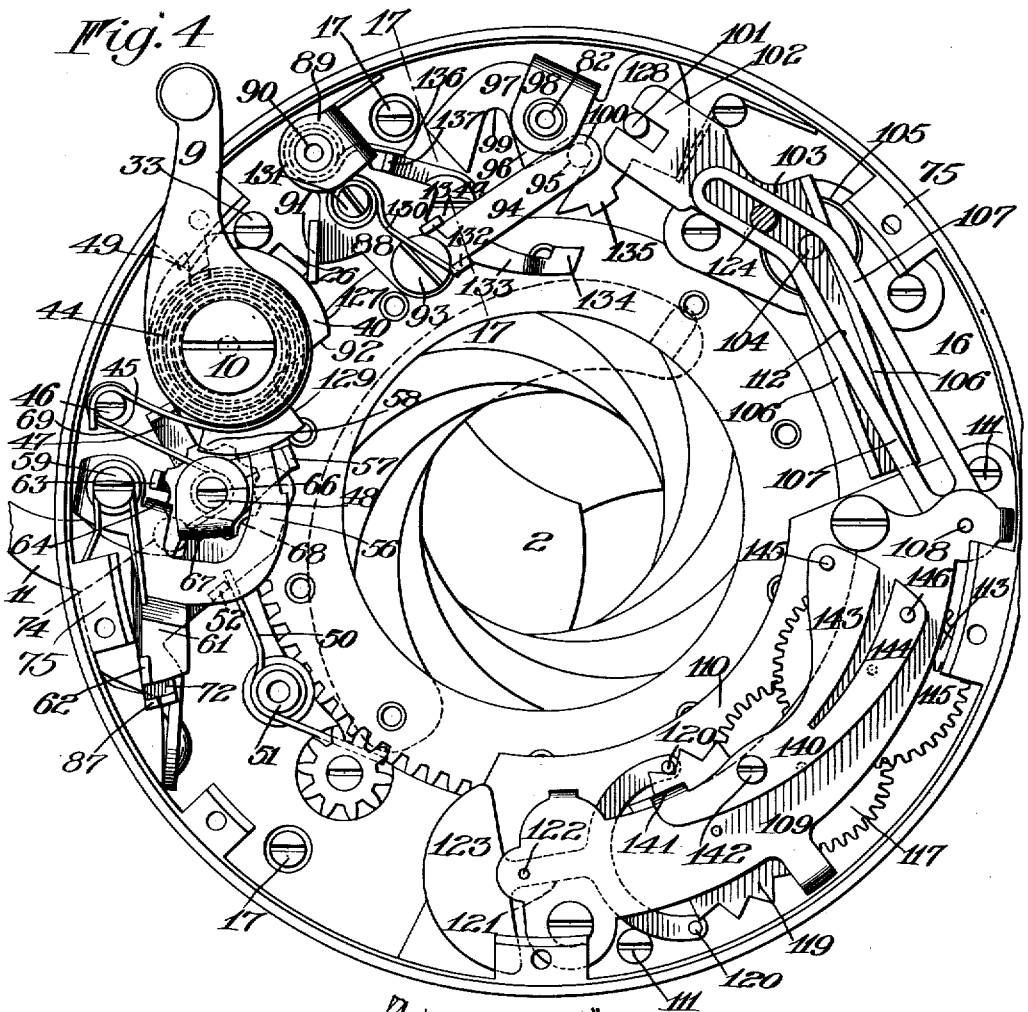

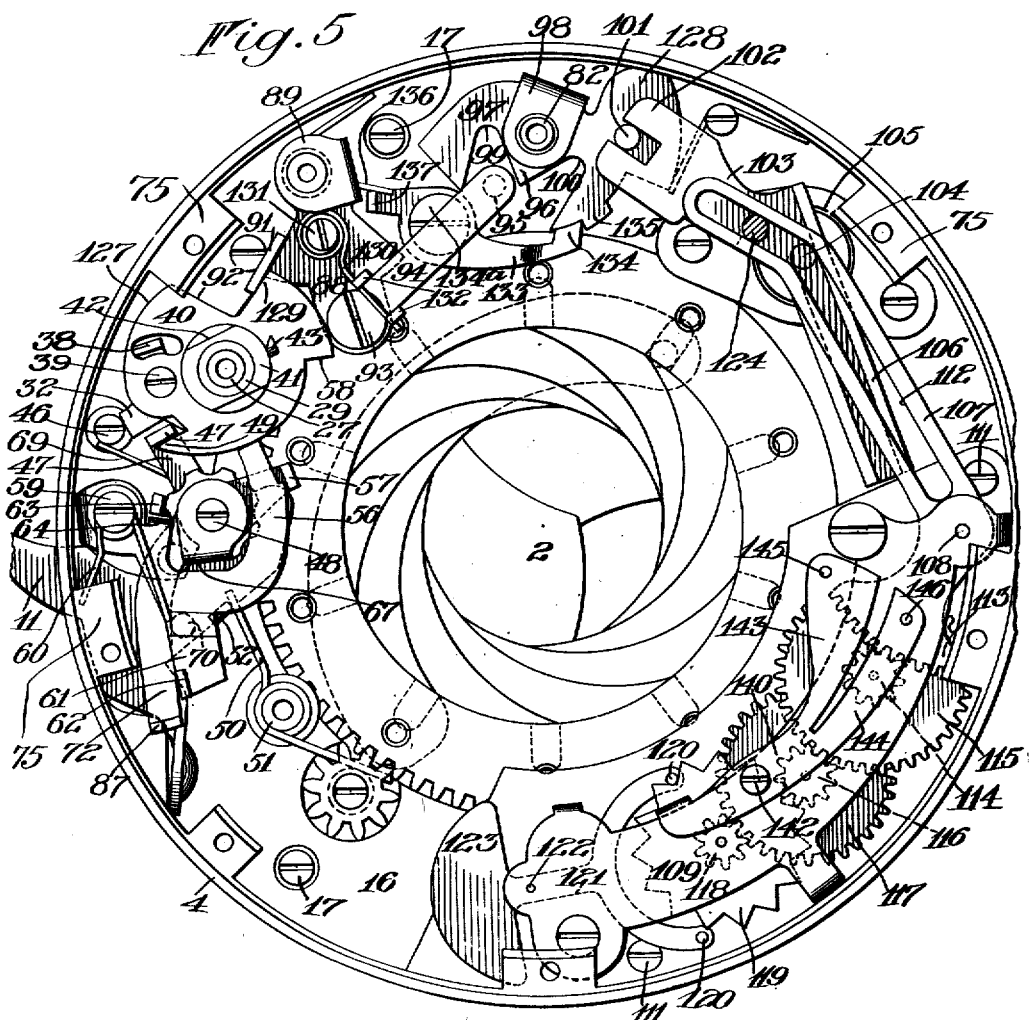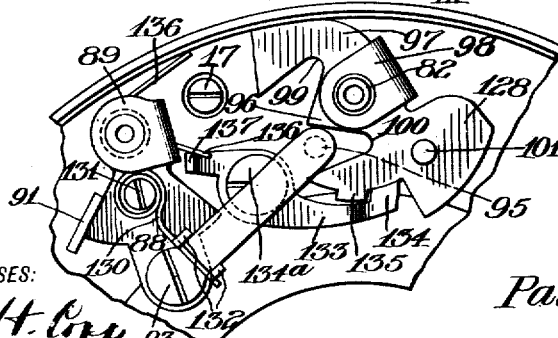

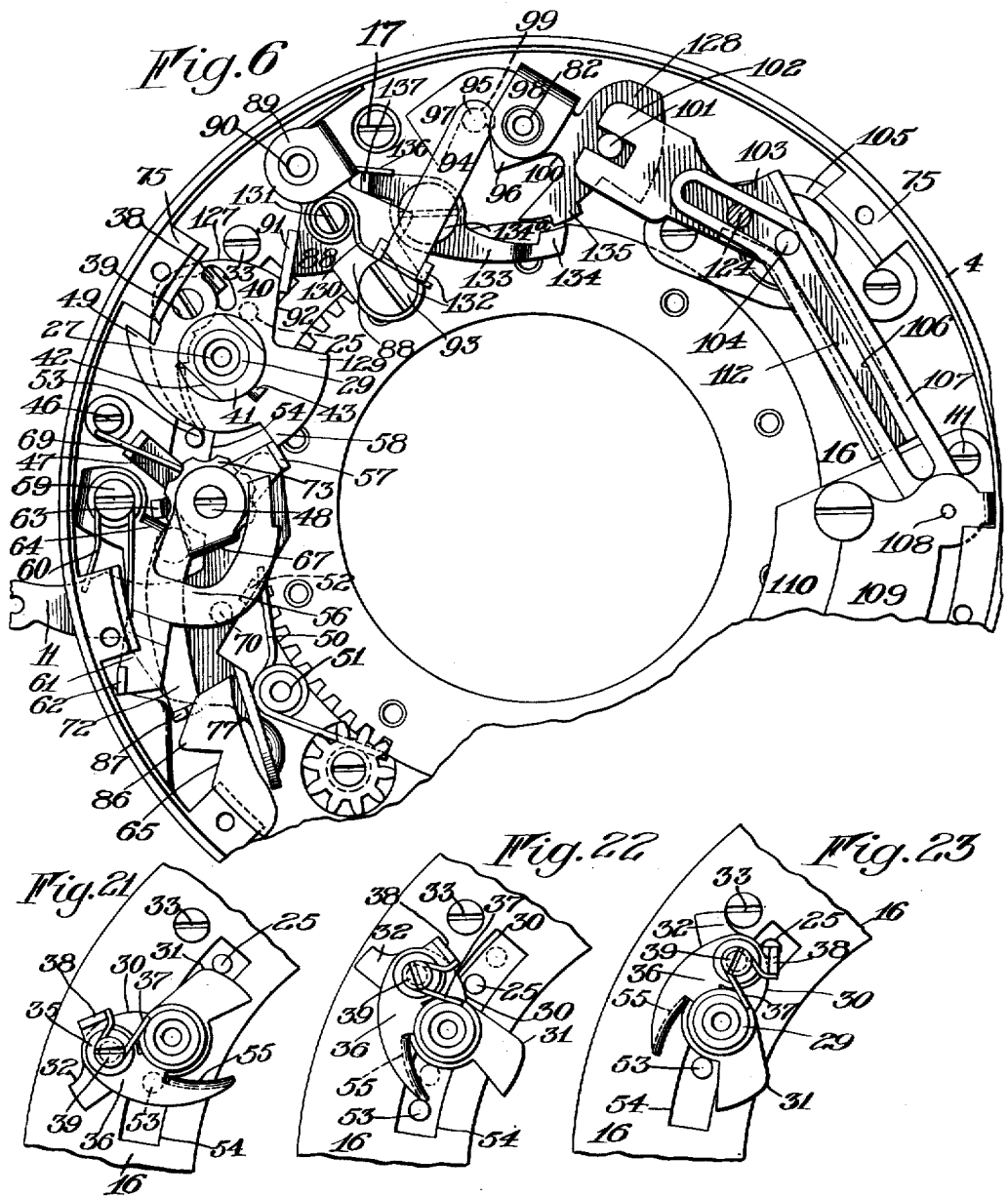

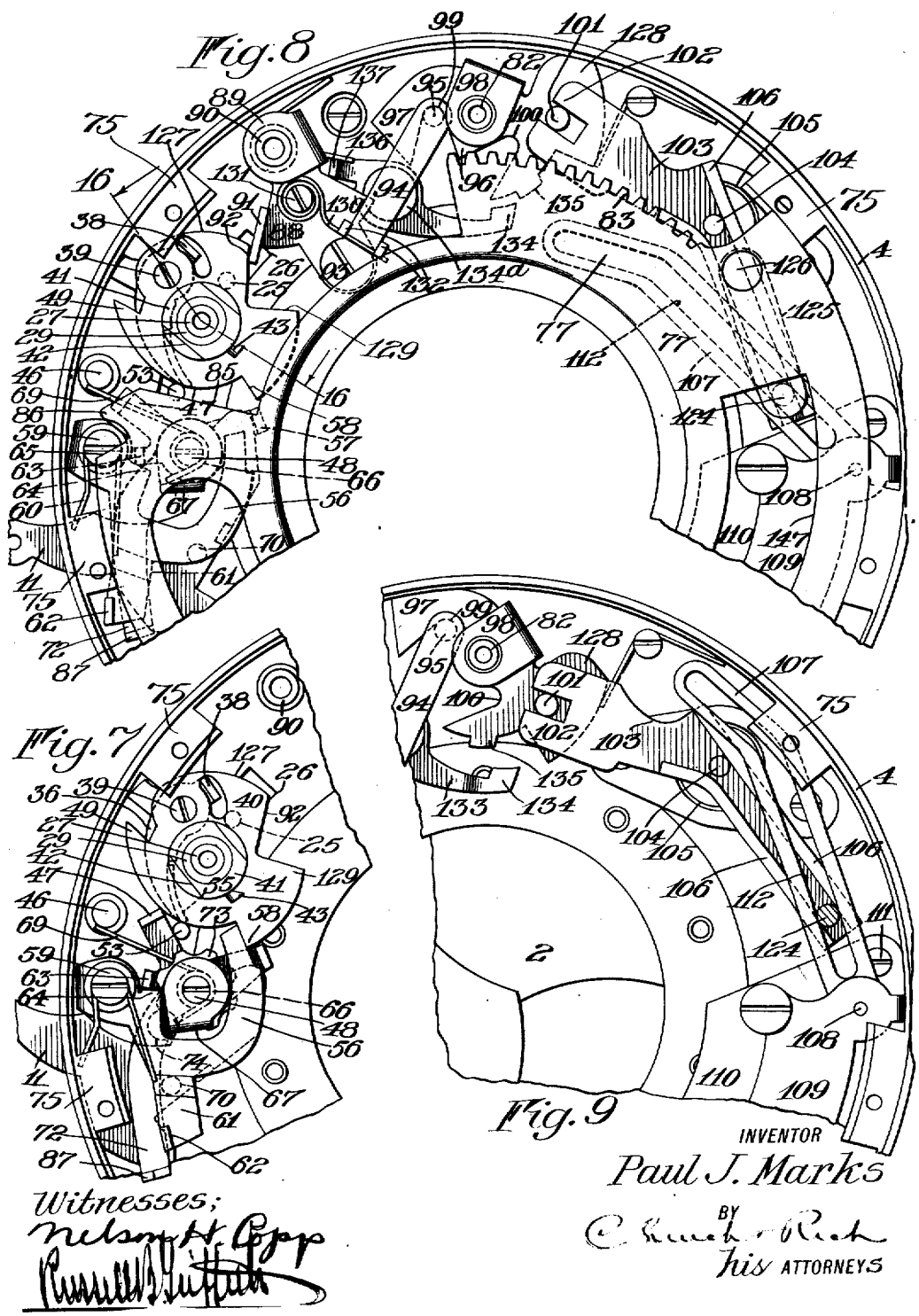

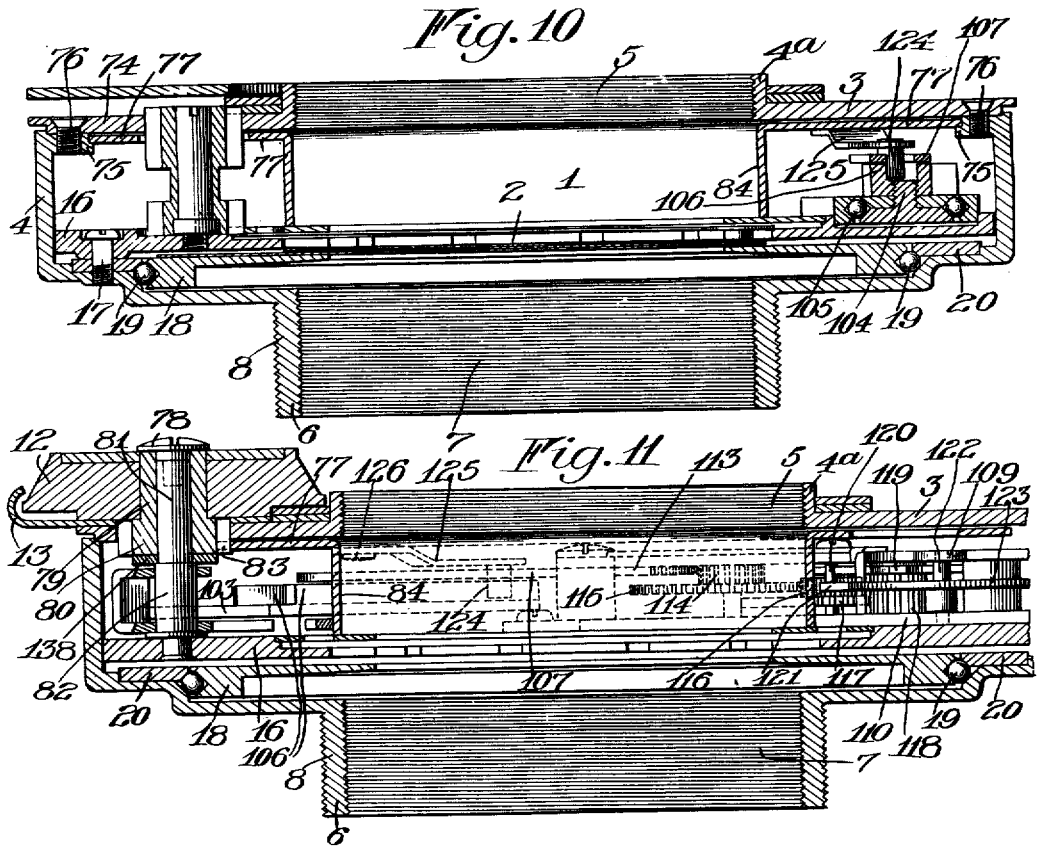
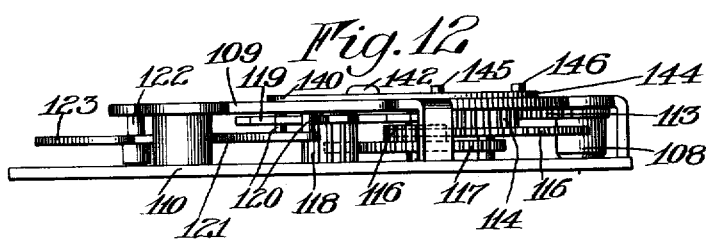

P. J. MARKS.
PHOTOGRAPHIC SHUTTER.
APPLICATION FILED APR. 2, 1917.
1,239,025.
Patented Sept. 4, 1917.
9 SHEETS—SHEET 9.
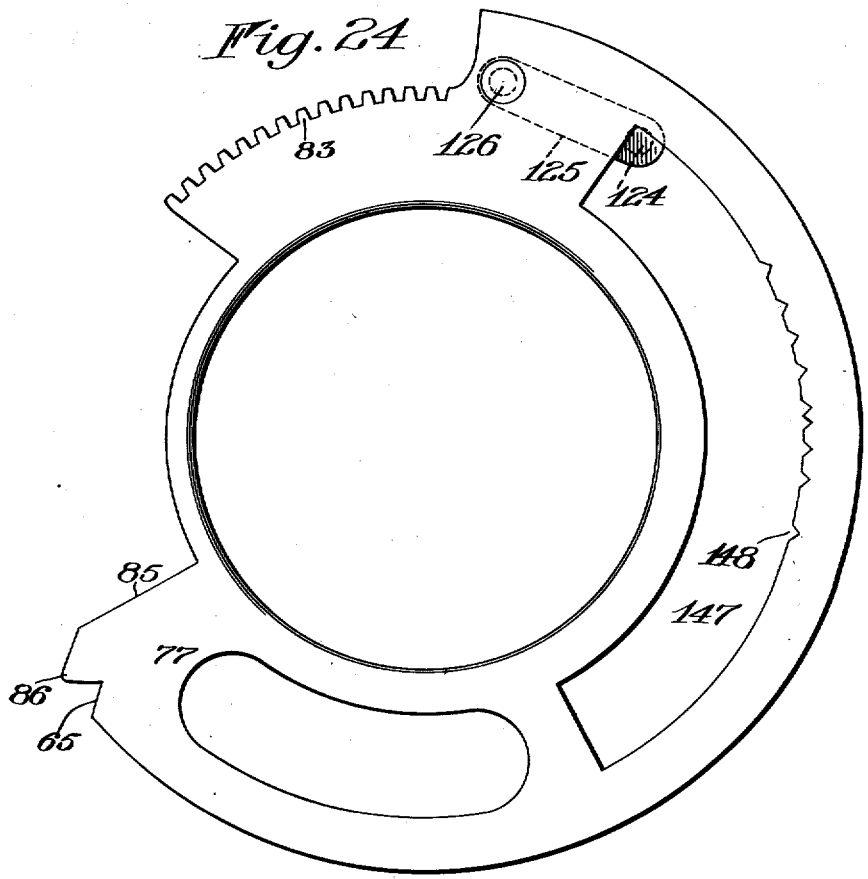
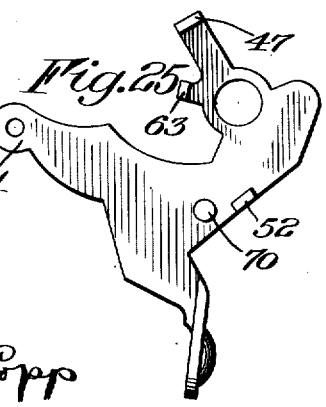
WITNESSES:
Nelson H. Copp
INVENTOR
Paul J. Marks
BY
his ATTORNEYS

UNITED STATES PATENT OFFICE.

PAUL J. MARKS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,239,025.      Specification of Letters Patent.      Patented Sept. 4, 1917.

Application filed April 2, 1917. Serial No. 159,215.

*To all whom it may concern:*

Be it known that I, PAUL J. MARKS, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters and it has for its object to provide a shutter mechanism of simple and durable construction that will be adapted for time, bulb and automatically timed and instantaneous exposures and in which a conveniently operable controlling means is utilized to produce the different exposures with uniform accuracy. The improvements are directed in part to the retarding devices for delaying to a greater or less degree the period during which the shutter aperture remains open for a given exposure and to the setting means whereby the retarding device is adjusted together with the relation of the setting means to other shutter elements. To these and other ends the invention resides in certain improvements and combinations of parts all as will be hereinafter more fully described, the novel features being pointed out in the claims at the end of the specification.

In the drawings:

Figure 1 is a front elevation of a photographic shutter constructed in accordance with and illustrating one embodiment of my invention;

Fig. 2 is an enlarged front view of the blade mechanism within the shutter casing with overlying parts removed;

Fig. 3 is an enlarged view of the shutter casing and the mechanism contained therein with the casing cover plate and other overlying parts removed, the blades being closed and the mechanism in normal position, though set for a time exposure;

Fig. 4 is a view similar to Fig. 3 with the controlling ring removed;

Fig. 5 is a view similar to Fig. 4 with the master or driving member energized or set ready for a time exposure;

Fig. 6 is a fragmentary view similar to Fig. 5 showing the position of the parts during a time exposure when the blades are open and the operating mechanism is caught on the bulb stop;

Fig. 7 is a fragmentary view similar to Fig. 6 showing the blades open during a time exposure and with the operating mechanism caught on the time stop;

Fig. 8 is a fragmentary view similar to Fig. 6 with the blades open and the mechanism operating during a relatively long automatically timed exposure;

Fig. 9 is a fragmentary detail view of a portion of the retarding mechanism shown in Fig. 8 showing the position of the parts upon completion of the operation;

Fig. 10 is a sectional view through the shutter taken substantially on the line 10—10 of Fig. 3 with the casing cover in place;

Fig. 11 is a sectional view through the shutter taken substantially on the line 11—11 of Fig. 3 with the casing cover in place;

Fig. 12 is an enlarged detail side elevation of part of the retarding mechanism;

Fig. 13 is an enlarged detail sectional view through the master or driving member taken substantially on the line 13—13 of Fig. 3;

Fig. 14 is an enlarged detail side elevation of the driving or master member and the time stop mechanism viewed from the side of the shutter aperture;

Fig. 15 is an enlarged detail sectional view through the time stop mechanism taken substantially on the line 15—15 of Fig. 3;

Fig. 16 is an enlarged detail sectional view through a portion of the master or driving member taken substantially on the line 16—16 of Fig. 8;

Fig. 17 is an enlarged detail sectional view through part of the retarding mechanism taken substantially on the line 17—17 of Fig. 4;

Fig. 18 is an enlarged detail view of the time stop mechanism in the position the parts occupy during a bulb exposure after the shutter has been released and the blades opened, the master member being caught on the bulb stop;

Fig. 19 is a view similar to Fig. 18 showing the completion of the bulb exposure with the time stop caught on the setting ring;

Fig. 20 is an enlarged fragmentary detail view of a portion of the retarding mechanism shown in Fig. 5 with a certain latch in a different locking position;

Figs. 21, 22 and 23 are enlarged detail fragmentary views of the blade actuating member carried by the master or driving member.

Fig. 24 is a detail plan view of the setting ring; Fig. 25 is a detail plan view of the shutter operating member.

Similar reference numerals throughout the several views indicate the same parts.

The shutter shown in the present embodiment of the invention is of the "set" type, that is, one in which a spring actuated driving or master member is wound or set and then tripped to furnish energy for the shutter operation and referring first to general features illustrated in Fig. 1, 1 indicates the shutter opening, 2 the blades, and 3 the annular cover plate for the annular casing 4 (Fig. 10) that houses the shutter mechanism. A collar 4ᵃ at the center of the cover ring 3 is interiorly threaded at 5 to receive the lens barrel (not shown) or the latter may be mounted within a rearwardly extending collar 6 on the bottom or back wall of the shutter casing interiorly threaded at 7 to receive it and exteriorly threaded at 8 for attachment to the camera. The setting lever (in the normal or deënergized position in Fig. 1) is indicated at 9 secured by a screw 10 to the arbor of the master or driving member to be later described, while 11 is the trip or shutter operating member. 12 is a rotary setting disk bearing characters denoting time, bulb and the various automatically timed exposures by means of which the operating mechanism is regulated to produce these different exposures and which coöperates with a fixed indicator finger 13 secured to the cover plate. A diaphragm controlling ring 14 having a bearing on the collar 4ᵃ is provided with a combination operating arm and indicating finger 15 coöperating with a scale 16 secured to the casing cover but this diaphragm mechanism has nothing to do with the present invention.

Referring now to Figs. 2 and 10, the blade mechanism is confined between the back or bottom of the casing 4 and a partition ring 16 secured thereto by screws 17. It embodies a ring 18 having a ball bearing 19 against the shutter casing, the said bearing including a ring 20 secured by screws 21. The blades 2 are, in the present instance, three in number and have forked portions 22 engaging fixed pivots 23 on the partition member 16 while lateral arms 24 serve as guiding and supporting means to insure their movement in definite planes. Also, each blade is perforated to pivotally receive a pin 25 on the ring 18 which projects therethrough and through a slot 26 in the partition 16. The blades are shown closed in Fig. 2 and it will be seen that when the ring 18 is rotated to the left in that figure, the pins 25 will cause the blades to rotate to the right on their pivots 23 and open, while a reverse movement will close them.

Referring now more particularly to Figs. 6, 21, 22, 23, 13 and 16, a pin or arbor 27 fixed in the partition member 16 and to which is secured the screw 10 that confines the setting lever 9 has journaled thereon a master or driving member in the form of a disk 28 having a hub 29. It is irregular in form comprising a cam 30, a cam 31 and an abutment 32 that engages a fixed pin 33 on the partition member 16 as a stop to limit its movement to the right, as shown in Fig. 23. It carries a pivot pin 34 (Fig. 16) on which turns beneath a shoulder 35 a switch cam 36. This cam is normally pressed in a counter clockwise direction by a spring 37 encircling the pivot above the shoulder 35 and engaging a projection 38 on the switch cam. The head 39 of the pivot above the spring takes into an aperture in a second disk or cam plate 40 having a hub 41 encircling the hub 29 and the two disks or plates and their hubs are thereby locked together for joint movement about the pin 27, although the hub 41 may be lifted off. The hub 41 has a squared portion 42 at its upper end by means of which the setting arm 9 is locked to it beneath the screw 10 while a laterally projecting pin 43 near its base interlocks with the inner end of a flat spiral driving spring 44 encircling both hubs. The outer end of this spring (see also Fig. 4) interlocks at 45 with a fixed pin 46 on the partition plate 16. It will therefore be seen that the spring is wound and both cam plates or disks 28 and 40 are rotated to the left by swinging the setting lever 9 to the left while the tendency of the spring is to rotate these parts to the right.

When wound, the spring 44 is held energized by a detent arm 47 on the shutter operating member or trip lever 11 which is pivoted on a fixed pin 48 on the partition member 16. As shown in Fig. 5, this detent locks with a shoulder 49 on the cam disk or plate 40 which engagement is automatically made by a spring 50 coiled about a fixed pin 51 and engaging an ear 52 on the operating member 11 to normally press the latter and the detent arm 47 to the right.

Sufficient of the mechanism has now been described to explain the manner in which an instantaneous exposure representing the greatest speed at which the blades will open and close, is effected. In addition to the blade engaging pins 25 on the blade ring 18, the latter carries a pin 53 projecting through a slot 54 in the partition member 16 in the region of the master or driving member. When the shutter is in the normal deënergized condition of Figs. 1, 2, 3 and 4, the pins 25 and 53 are at the right hand ends of their slots and the pin 25 adjacent to the driving member is held engaged by the cam surface 30 on the disk plate 28 of the master member as shown in Fig. 23, which locks the blades closed and prevents them from jarring open or otherwise making a false exposure. Upon turning the setting lever 9 to the left to wind the spring 44, the latch cam 36 is moved bodily from the position of Fig. 23 to that of Fig. 21 and in doing so, a downwardly turned cam flange 55 thereon snaps over the outer side of pin 53 assuming a position in which it is prepared to pass on the inner side thereof upon a reversal of that movement. The cam 31 at the same time, goes into engagement with pin 25 to replace cam 30 in locking the blades closed and when the spring is fully wound, the detent 47 catches on the shoulder 49 of the driving member and holds the energized spring. To trip the shutter and effect the exposure, the shutter operating lever 11 is now depressed, retracting the detent 47. The driving member revolves to the right from the position of Fig. 21 to that of Fig. 23 or until the abutment 32 comes back into engagement with the stop pin 33. In so doing, the cam flange 55 of the switch cam 36, being locked against rotation to the left by engagement with the hub 41, passes on the inside of the pin 53 and displaces it outwardly, as shown in Fig. 22, thus rotating the blade ring 18 to the left and opening the blades 2. This occurs during the first half of the movement of the driving member. During the last half of the movement beginning when the cam flange 55 leaves the pin 53 as in Fig. 22, the cam surface 30 on the driving disk 28 comes in contact with the adjacent pin 25 and immediately rotates the blade ring 18 to the right again closing the blades and locking them closed, as in Fig. 23. During all operations of the shutter, the blades are opened and closed in this same manner: for time and bulb exposures, the partial revolution of the driving member is divided into two operations, the first of which opens the blades and the last of which closes them, while for automatically timed exposures of greater or less duration, variable retarding devices are brought into play to impede the progress of the driving member while the shutter is open. These features will now be described and explained.

Taking first the time exposure, the shutter operating member 11 aside from operating the detent 47, has control over the time stop 56 and the bulb stop 57, both of which are movable into and out of the path of an abutment 58 on the disk 40 of the driving or master member. The time stop 56 is pivoted on a fixed pin 59 and is urged into the path of the master member by a spring 60 coiled about its pivot. Aside from the stop arm 56, it has another detent arm 61 provided with an ear 62. The stop arm is withdrawn from the path of the master member against the tension of its spring by an upwardly projecting arm 63 on the operating lever 11 engaging it at 64 (Fig. 15). The bulb stop 57 is pivoted on the fixed pin 48 and is normally urged toward the path of the abutment 58 on the driving member by a spring 66 engaging the yoked portion 67 of the bulb stop at 68 and the same fixed pin 46 that engages the main spring 44 at 69. But the spring 50 of the operating member 11 is stronger than the spring 66 of the bulb stop and a pin 70 on the operating member engages an arm 72 on the bulb stop to normally hold it retracted. When, however, the operating member 11 is depressed and the pin 70 releases the arm 72, the time stop 57 can move into the path of the master member.

It may be here stated that as both the bulb stop 57 and the operating member 11 are pivoted upon the pin 48, this pin receives a great deal of wear. Yet it is desirable to provide a screw pin for this purpose for assembly purposes. I therefore provide it with a toothed locking flange 73 with which coöperates a locking pin 74 in the partition member 16 to prevent it from loosening. The operating lever turns beneath this flange while the bulb stop 57 turns above it, as shown in Fig. 15.

The production of a time exposure will now be explained, attention being called to the fact that Fig. 3 shows the normal position of the parts when the shutter is ready to be set for time exposure, and also Fig. 4; Fig. 5 shows the parts adjusted for time exposure with the driving member set just before being released; Fig. 6 shows the blades open during a time exposure on the first release of the operating member, and Fig. 7 shows the stop mechanism ready for the second release with the blades open. Starting with the normal position of Fig. 4 where the master member is run down and against the stop pin 33, the time stop 56 rests idly against a concentric portion of the cam plate or disk 40. As the driving member is wound by moving the lever 9 to the left, the position of Fig. 5 is assumed, the detent 47 going into engagement with the abutment 49 and holding the shutter set. The pin 70 on the operating lever 11 holds the bulb stop 57 out of the path of the abutment 58 and while the time stop 56 goes back into the path of the abutment 58 on the driving member as soon as the detent 47 springs into place, it is not allowed to remain there. Upon tripping the shutter by depressing the operating lever 11 as in Fig. 6, the pin 70 on the latter moves away from the bulb stop arm 72 allowing the bulb stop 57 under the influence of its spring, to catch the abutment 58 of the driving member and halt it with the blades open. At the same time, the arm 63 on the operating lever 11 retracts the time stop 56 by its engagement at 64. As the operating lever 11 returns, the pin 70 thereon retracts the bulb stop 57, as in Fig. 7 but as this movement of the operating lever at the same time releases the time stop 56 from restraint at 64 by the finger or arm 63, the abutment 58 is merely shifted from the bulb stop 57 to the time stop 56, all as shown in the last mentioned figure, the blades remaining open. Upon the next actuation of the operating lever 11, the time stop is withdrawn by the arm 63, the abutment 58 has already passed the bulb stop and the driving member completes the remaining half of its movement, closing the blades. It will be understood that when the shift from the bulb to the time stop is made, as in Fig. 7, and the driving member has completed only half of its movement, the blade actuating mechanism is in the position of Fig. 22 which is the reason the blades are held open.

For a bulb exposure, the action for time exposure must be so varied that the driving member is halted with the blades open when the operating lever 11 is actuated but is immediately released when the operating lever is released so that a second actuation is not required. To effect this, the influence of the time stop 56 upon the driving member is entirely eliminated in the following manner:

The cover ring 3 is fastened to the casing 4 by means of lugs 75 projecting inwardly from the top edge of the peripheral or side wall of the casing and screws 76 (Figs. 1 and 10) coöperating therewith. The cover plate and the lugs being in direct contact, there is an advantage in this because excessive tightening of the screws does not warp the plate as is the case in constructions where long screws extend through to the back of the casing at points removed from the points of contact of the cover and casing. A setting ring 77 (Figs. 3 and 10) has bearing at various points against these lugs and is confined between them and the cover ring 3. The ring may be rotated to different positions by means of the setting wheel 12 on the exterior (Fig. 1) which is secured by a screw 78 (Fig. 11) to the squared hub 79 of a gear 80 turning on the reduced portion 81 of a fixed pin 82 secured in the partition member 16. The screw 78 is threaded into the end of the pin and the wheel and gear turn together relatively to it. The gear 80 meshes with a toothed portion 83 on the ring 77. And the latter carries, at its open center a collar or light tube 84 that projects through the blade opening 1 to the region of the partition 16.

When the ring 77 is adjusted to the position of Fig. 3, the indicator finger 13 of Fig. 1 points to "T" meaning time exposure and it sets the shutter for the time exposure that has been described because a cutaway portion 85 of the ring is then opposite the arms 61 and 72 of the time and bulb stops 56 and 57, respectively, and does not interfere with their freedom of movement. When the indicator wheel 12 is moved to register "B," however, a contact point 86 on the ring comes directly in the path of the ear 62 on the time stop arm 61. The bulb stop lever 72 is also provided with a detaining ear 87 but this is not interfered with because adjacent to the contact 86 of the ring is a notch 65 that permits the ear 87 and hence the bulb stop 57 to operate with freedom as before. Therefore, during this bulb exposure upon actuation of the trip or operating lever 11 after winding the driving member by means of the lever 9, the shoulder or abutment 58 is caught upon the bulb stop 57 as in a time exposure and as shown in Fig. 18, but upon releasing the operating member 11 again, the time stop 56 does not go into the path of the driving member as it is held out by contact of the ear 62 with the contact member 86 of the ring 77 (Fig. 19) and the bulb stop 57 being withdrawn by the pin 70 striking the arm 72, the master or driving member completes its movement and closes the blades without further manipulation.

The time, bulb and instantaneous exposures have now been described. For the automatically timed exposures graded from instantaneous up to half a second or more, a retarding mechanism is brought into play by further adjustments of the ring 77 which retarding mechanism drags upon the spring driven master member, slowing up its action and increasing the interval between the opening and the closing of the blades. It is constructed and arranged as follows:

Referring more particularly to Figs. 4 and 17, a pivoted member 88 having a yoked end 89 turning on a fixed pin 90 is provided with a contact ear or finger 91 that may swing into and out of the path of an abutment 92 on the disk plate 40 of the driving member. Pivoted to it at 93 is a link 94 having at its free end and on its under side a pin 95. This pin 95 is adapted to travel alternately upon the slopes of a V-shaped switch cam 96 on a lever 97 pivoted by means of a yoked portion 98 on the base of the same pin 82 that carries the setting wheel 12 (Fig. 11). Each face of the switch cam terminates in an abutment 99 and 100, respectively, on opposite sides of the pivot 82 of the lever. A pin 101 on the other arm of the lever 97 is engaged by the forked end 102 of a lever 103 pivoted at 104 in a ball bearing 105 on the partition member 16 and the opposite end of this lever is flanged at 106 to form a narrow trough or guideway. Above said arm and guideway and adapted to swing across the same and across the pivotal point 104 is the arm 107 of a segment lever pivoted at 108 between the upper plate 109 and the lower plate 110 of a gear train frame secured to the partition plate 16 by screws 111. The arm 107 has a slot 112 throughout its length adapted to intersect the guideway 106 of the lever 103 at any point including the pivotal point 104.

The segment lever embodying the arm 107 and the gear train are best shown in Fig. 5, the toothed segment being indicated at 113. The latter meshes at all times with a small gear 114 of a gear train comprising also gears 115, 116, 117 and 118, designated in the order of their drive and the last mentioned one of them being fixed to the star wheel 119 of an escapement mechanism. Coöperating with the star wheel are the pins 120 on a yoke lever 121 pivoted at 122 and carrying a weight 123 which latter is vibrated rapidly during the motion of the train. It will thus be seen that the segment lever 107 can be vibrated only under the load required to drive the gear train and overcome the inertia of the escapement including the weight 123.

The said segment lever is so vibrated in two directions by the lever 103 through the medium of a shiftable fulcrum pin 124 that extends through the slot 112 of the segment lever and into the guideway formed between the flanges 106 of the lever 103. This fulcrum pin 124 is carried on the free end of a link 125 pivoted at 126 to the setting ring 77, as shown in dotted lines in Fig. 8 and in full lines in Fig. 10. As the ring 77 is rotated, the pin 124 is shifted along the slot 112 and guide 106 to vary the throw of lever 107 as communicated by a lever 103, the relative positions of the two levers conforming to the position of the segment pin.

In the normal position of the shutter before being wound for an exposure, the pivoted member 88 is in the position of Fig. 4 and others with the contact 91 resting against a concentric surface 127 of the disk 40 of the driving member. The pin 95 of the link 94 may then be either in contact with the abutment 100 on the switch cam 96 of lever 97, as shown in Fig. 4 or in contact with abutment 99. In the first instance, a portion 128 on the lever 97 is held locked against the side wall of the shutter casing and in the latter instance, the lever has been rocked in the other direction into contact with said wall.

Assuming the parts to be in the position of Fig. 4, when the driving member is set by means of the arm 9, the contact member 91 drops off of the concentric surface 127 as soon as abutment 92 has passed it and is engaged by an abutment 129 on the disk 40 of the driving member effective in the opposite direction of rotation from abutment 92. This rocks the pivoted member 88 to the position of Fig. 5 and withdraws the link 94 so that the pin 95 thereon leaves abutment 100 and moves up the face of the switch cam 96. When it gets to the point of the cam, a spring 130 secured to the pivoted member 88 at 131 and which rocks upon two ears 132 near the pivot of the link, shifts the latter over to the position of Fig. 5 opposite the other incline of the cam. The shutter being thus set or wound, the action of its retarding mechanism during its operation is as follows, the reference being still to Fig. 5:

The detent 47 being withdrawn as before through the operating lever 11, the driving or master member rotates to the right under the influence of its spring 44 and the abutment 92 engages the contact member 91 on the pivoted member 88 rocking it in a counter clockwise direction. The link 94 through its pin 95 slides down the cam 96 into engagement with abutment 99, as shown in Fig. 8, rocking lever 97 in a clockwise direction. Through lever 97, lever 103 is rocked and through the fulcrum pin 124, segment lever 107 is rocked, driving the gear train to a greater or less extent according to the position of said fulcrum pin and all of these movements are reflected in the driving member by correspondingly slowing its rate of travel and prolonging the period before which it can finally close the shutter blades. In Fig. 8 the fulcrum pin 124 has been moved down far from the pivot 104 of the lever 103 and close to the pivot 108 of the segment lever. Hence, the adjustment is for the longest automatically timed exposure for the long sweep of the lever 103 drives the segment and gearing through a maximum movement and it has the minimum of mechanical advantage against the segment lever because close to its pivot.

As before stated, the shifting fulcrum 124 is linked to the same setting ring 77 that has been previously described as controlling the time and bulb stops. When the ring is set for a time exposure as in Fig. 3 with the cutaway portion 85 thereof opposite the time and bulb stop detent ears 62 and 87, the fulcrum pin 124 comes very close to the pivot 104 of lever 103 and very far from the pivot of segment lever 107 so that the motion communicated to the latter is negligible and the retarding devices do not interfere with the separate opening and closing movements of the blades under the two actuations of the operating lever 11. Similarly, when the ring is adjusted for a bulb exposure with the contact 86 in the path of the time stop ear 62 and the notch 65 opposite the bulb stop contact ear 87, as in Fig. 18, the fulcrum is close to pivot 104. When the ring is adjusted for any automatically timed exposure, the time and bulb stop ears 62 and 87 ride upon the remaining concentric peripheral surface of the ring 77 as in Fig. 8 and both the time stop 56 and the bulb stop 57 are permanently held out of a position to interfere with the travel of the driving member. With an adjustment of the setting ring for an instantaneous exposure, the shiftable fulcrum pin 124 comes into coincidence or substantial coincidence with the pivot 104 of the lever 103 so that the segment lever and gear train are not moved at all. The walls of the notch 65 and the end face of the adjacent contact member 86 are all inclined as shown to act as cams that will gently raise the time and bulb stop ears 62 and 87 onto the periphery of the ring in case the latter is shifted while either the time or bulb stop is in engaging position.

The adjustment of the setting ring 77 has been described as being under the control of the exterior wheel 12 bearing suitable characters indicative of the several exposures and working in connection with the indicator finger 13. In order to retain the said wheel in the ring in the different positions of adjustment, the latter is acted upon by a yielding stop which prevents the parts from being inadvertently moved through the effect of the stop can be forcibly overcome by turning the wheel 12. In the present instance, the stop is in the form of a spring plate 140 (Fig. 4) secured by an ear 141 and a screw 142 to the uper plate 109 of the gear train support. A free end of the plate is bifurcated to form two spring arms 143 and 144, respectively, carrying pins 145 and 146. Both of these pins work in and engage opposite sides of a segmental slot 147 in the ring 77. The outer side of the slot is provided with a plurality of shallow notches 148 at suitable intervals and into these the pin 146 is adapted to spring successively as the ring is rotated. Its engagement with each one defines the position of the ring for a certain exposure. It is shown in the time exposure notch in Fig. 3, which is at one end of the series, that at the opposite end being for the longest automatically timed exposure. The other pin 145 bears yieldingly at all times against the other concentric side of the slot and supplies sufficient frictional resistance to make the movement of the ring gradual and to counterbalance the pressure of the pin 146 thereon.

If an adjustment of the ring 77 is made to shift the fulcrum pin 124 and change the setting of the retarding mechanism for a different period of automatically timed exposure while the shutter is in normal or run-down position, it will be seen that only the segment lever 107 will be rocked to conform to the new position and the lever 103 will remain rigidly in position for the reason that the lever 97 is being held fixed against the casing wall by the link 94 in engagement with one of its abutments and the link cannot move because the pivoted member 88 has its contact 91 in close engagement with the concentric peripheral surface 127 of the driving member all as shown in Fig. 4, for instance. If, however, the ring 77 be adjusted after the master member were wound or set, the lever 97 and the parts to which it communicates motion would not then be so locked, as shown in Figs. 5 and 20, the link pin 95 being then in engagement with neither the abutment 99 nor the abutment 100. Consequently, the shifting movement of the fulcrum pin 124 might change the position of the lever 103 instead of the segment lever 107 or change the position of both of them and there would be a consequent lack of uniformity in the operation of the retarding device due to the fact that the link 94 would not pick up the lever 97 at the proper point. I therefore provide a means for automatically locking the lever 97 while the driving member is set and causing the segment lever 107 alone to be adjusted to compensate for the change in position of the fulcrum pin 124. This means comprises, in the present instance, a latch 133 turning on a fixed pivot 134 on the partition member 16. It has an engaging head 134 adapted to engage upon one side of a catch 135 on the lever 97 when the latter is in one position, as shown in Fig. 5, and on the other side when the lever is in its other position, as shown in Fig. 20. A spring 136 carried on the pivot of the member 88 coöperates with a finger 137 on the latch tending to throw it into operative position. It does so shift it as soon as the setting of the shutter causes the abutment 129 on the driving member, through engagement with contact ear 91, to rock member 88 into the path of abutment 92 on the driving member, as shown in Fig. 5. As soon as the shutter is released and member 88 takes the impact of the driving member, it engages finger 137 immediately and retracts the latch, holding it out of engagement by the time the link 94 becomes effective against lever 97 and until the link is shifted again during the setting of the shutter. It is the latch spring 136 acting through the finger 137 and against member 88 that rocks the contact 91 into a position to be picked up by abutment 129 on the driving member as the latter is wound or set. In Fig. 4, the finger 137 will be seen to be against the member 88 while contact 91 is against the concentric portion 127 of the driving member.

In Fig. 3 an overlying plate 138 is shown connecting the pivots 90 and 82. This is for the purpose of strengthening these pivots which undergo considerable strain and an extension 139 of the plate is brought into proximity with the main driving spring 44 of the master member to prevent it from expanding unduly when run down. An even more important function of the plate 138 is to provide a bearing at this side of the case for the ring 77 holding it firmly against the lugs 75 and steadying it against the influence of the tension or centering device 140.

The mode of operation throughout time, bulb and automatically timed exposures having been explained in connection with the description of the more or less separate though related mechanisms through which the different actions of the blades are obtained, further reference to the mode of using the shutter as a whole is believed to be unnecessary.

I claim as my invention:

1. In a photographic shutter, the combination with a blade mechanism and a pivoted element provided with two abutments on opposite sides of its pivotal center, of a retarding lever adapted for retarding action in both directions of movement, means including a shiftable fulcrum for imparting varying degrees of leverage from the pivoted element to the retarding lever, a driving member for operating the blade mechanism and means for exerting the energy of the driving member against first one abutment of the pivoted element and then the other upon successive operations of the shutter.

2. In a photographic shutter, the combination with a blade mechanism, a gear train retarding device, a segment lever in constant mesh with the gear train to operate it in both directions and a driving member for operating the blade mechanism, of mechanism including a shiftable fulcrum adapted to be adjusted by the operator for imparting the energy of the driving member, with varying degrees of leverage, to the segment lever in first one direction and then the other upon successive operations of the shutter.

3. In a photographic shutter, the combination with a blade mechanism, a retarding device, a retarding lever coöperating therewith, and a driving member for operating the blade mechanism, of a shiftable fulcrum, and a pivoted member adapted to impart the energy of the driving member to the retarding lever through said fulcrum, the latter being movable into coincidence with the turning axis of one of said parts.

4. In a photographic shutter, the combination with a blade mechanism, a gear train retarding device, a driving member for operating the blade mechanism, and a pivoted element also actuated by the driving member, of a segment lever coöperating with the gear train and having a slot therein extending through the axis of the pivoted element, a shiftable fulcrum movable in the slot of the segment lever and operatively connecting it with the pivoted element and a setting device on the exterior of the shutter for controlling the shiftable fulcrum.

5. In a photographic shutter, the combination with a blade mechanism, a pivoted element provided with two abutments on opposite sides of its pivotal center, a driving member for operating the blade mechanism, and means for exerting the energy of the driving member against first one abutment of the pivoted element and then the other, upon successive operations of the shutter, of a retarding lever adapted for retarding action in both directions of movement and provided with an elongated bearing, an intermediate lever also having an elongated bearing in one arm and a forked portion on the other engaging the pivoted element, and a shiftable fulcrum operatively connecting the intermediate lever and the retarding lever and movable in the elongated bearings thereof.

6. In a photographic shutter, the combination with a blade mechanism, a retarding device, and a pivoted element operatively connected with the latter and having a retarding action in both directions of movement, of a driving member for operating the blade mechanism, means for exerting the energy of the driving member against the pivoted member in first one direction and then the other with successive operations of the shutter, and a latch coöperating with the pivoted element to retain its relationship to the driving member during the shifting of said means.

7. In a photographic shutter, the combination with a blade mechanism, a retarding device and a pivoted element operatively connected to the latter and having a retarding action in both directions of movement, said element being provided with two abutments on opposite sides of its pivotal center, of a driving member for operating the blade mechanism, means for exerting the energy of the latter against first one abutment and then the other of the pivoted element and a latch coöperating with the latter during the shifting of said means.

8. In a photographic shutter, the combination with a blade mechanism, a retarding device, a retarding lever coöperating therewith, and a driving member for operating the blade mechanism, of a pivoted element having two abutments on opposite sides of its pivotal center, means for exerting the energy of the driving member against first one abutment and then the other, a shiftable fulcrum through which the pivoted element actuates the retarding lever, and a latch coöperating with the pivoted element when relieved of pressure from the driving member.

9. In a photographic shutter, the combination with a blade mechanism, a gear train, a segment lever in constant mesh with the latter and a driving member for operating the blade mechanism, of a pivoted element having two abutments on opposite sides of its pivotal center, means for exerting the energy of the driving member against first one abutment and then the other upon successive operations of the shutter, a shiftable fulcrum through which the pivoted element actuates the retarding lever, and a spring latch coöperating with the pivoted element when the driving member is in set position, said latch being adapted to be released by said means in advance of its actuation of the pivoted member.

10. In a photographic shutter, the combination with a blade mechanism, a retarding device, a retarding lever coöperating therewith and a driving member for operating the blade mechanism, of a shiftable fulcrum, a pivoted member adapted to impart the energy of the driving member to the retarding lever through said fulcrum and a rotary ring on which the fulcrum is carried to effect its adjustment.

11. In a photographic shutter, the combination with a blade mechanism, a retarding device, a retarding lever coöperating therewith, a driving member for operating the blade mechanism, and time and bulb stops controlling the driving member, of a shiftable fulcrum, a pivoted member adapted to impart the energy of the driving member to the retarding lever through said fulcrum and a rotary ring for controlling the shiftable fulcrum and also the time and bulb stops.

12. In a photographic shutter, the combination with a shutter casing in the form of an annulus and having a cover ring, provided with an opening, of a blade mechanism, a driving member for operating it, means for varying the action of the driving member on the blade mechanism and a toothed adjusting ring controlling said means, all arranged within the casing, and a setting device arranged exteriorly of the shutter and embodying gearing extending through the opening in the cover plate and coöperating with the toothed ring.

13. In a photographic shutter, the combination with an annular shutter casing having interior lugs on its side walls and having a cover ring secured to said lugs, of a blade mechanism, a driving member for operating it, means for varying the action of the driving member on the blade mechanism, and a rotary adjusting ring controlling said means supported by the lugs on the casing walls.

14. In a photographic shutter, the combination with an annular shutter casing, of a blade mechanism, a driving member for operating it, means for varying the action of the driving member on the blade mechanism and a rotary adjusting ring controlling said means supported on the casing walls and carrying a light tube extending through the center of the shutter casing.

PAUL J. MARKS.

Witnesses:
Russell B. Griffith,
Agnes Nesbett Bissell.